United States Patent
Nakamura et al.

(10) Patent No.: US 12,184,212 B2
(45) Date of Patent: Dec. 31, 2024

(54) SWITCHED RELUCTANCE MOTOR AND CONTROL METHOD THEREFOR

(71) Applicant: Kyoto University, Kyoto (JP)

(72) Inventors: Taketsune Nakamura, Kyoto (JP); Fuat Kucuk, Kyoto (JP)

(73) Assignee: Kyoto University, Kyoto (JP)

( * ) Notice: Subject to any disclaimer, the term of this patent is extended or adjusted under 35 U.S.C. 154(b) by 285 days.

(21) Appl. No.: 17/754,511

(22) PCT Filed: Oct. 9, 2020

(86) PCT No.: PCT/JP2020/038264
§ 371 (c)(1),
(2) Date: Apr. 4, 2022

(87) PCT Pub. No.: WO2021/070926
PCT Pub. Date: Apr. 15, 2021

(65) Prior Publication Data
US 2023/0253903 A1    Aug. 10, 2023

(30) Foreign Application Priority Data

Oct. 11, 2019  (JP) .................................. 2019-187814

(51) Int. Cl.
*H02P 25/08* (2016.01)
*H02K 1/14* (2006.01)
(Continued)

(52) U.S. Cl.
CPC ............... *H02P 25/08* (2013.01); *H02K 1/14* (2013.01); *H02K 1/24* (2013.01); *H02K 11/33* (2016.01)

(58) Field of Classification Search
CPC ............ H02K 1/14; H02K 1/24; H02K 1/246; H02K 1/16; H02K 1/165; H02K 1/17;
(Continued)

(56) References Cited

U.S. PATENT DOCUMENTS 5,825,112 A * 10/1998 Lipo ...................... H02K 19/24
                                                     310/168
2009/0160391 A1* 6/2009 Flynn ..................... H02K 21/44
                                                    310/49.46

(Continued)

FOREIGN PATENT DOCUMENTS

CN       103973062       6/2016
CN       103973062 B  *  6/2016
(Continued)

OTHER PUBLICATIONS

Machine translation of CN-103973062-B. (Year: 2016).*
(Continued)

*Primary Examiner* — Michael Andrews
(74) *Attorney, Agent, or Firm* — Knobbe, Martens, Olson & Bear, LLP

(57) ABSTRACT

A motor main body of a switched reluctance motor includes a rotor-having a plurality of rotor salient poles, a stator having a plurality of stator salient poles, a drive winding of each phase wound around stator salient poles of the plurality of stator salient poles, of the phase, and a permanent magnet disposed in a stator yoke. A drive circuit outputs a drive current to the drive winding of each phase to rotate the rotor. A pulse current output circuit outputs a pulse current to be superimposed on the drive current during an application time shorter than an application time of the drive current to the drive winding of each phase.

6 Claims, 11 Drawing Sheets

(51) Int. Cl.
*H02K 1/24* (2006.01)
*H02K 11/33* (2016.01)

(58) Field of Classification Search
CPC .. H02K 2201/00; H02K 19/103; H02K 19/20; H02K 19/24; H02K 21/04; H02K 21/38; H02K 21/44; H02K 11/33; H02K 11/30; H02P 25/08; H02P 25/083
USPC .................................. 310/68 R, 154.02, 181
See application file for complete search history.

(56) References Cited

U.S. PATENT DOCUMENTS

| | | | |
|---|---|---|---|
| 2010/0170741 A1* | 7/2010 | Yamashita | H02K 21/44 310/46 |
| 2013/0049494 A1* | 2/2013 | Jung | H02K 21/44 310/46 |
| 2021/0167645 A1* | 6/2021 | Nashiki | H02K 19/103 |
| 2022/0085674 A1* | 3/2022 | Mizuta | H02K 1/2766 |

FOREIGN PATENT DOCUMENTS

| | | |
|---|---|---|
| CN | 106100272 | 6/2018 |
| EP | 3073621 A1 | 9/2016 |
| JP | H02-205307 A | 8/1990 |
| JP | 2007-282323 A | 10/2007 |
| JP | 2011-172481 A | 9/2011 |
| JP | 2016 163514 A | 9/2016 |
| JP | 2018-093109 A | 6/2018 |
| JP | 2018-174649 A | 11/2018 |
| JP | 2019-097379 A | 6/2019 |
| WO | WO 2012/110883 | 8/2012 |
| WO | WO 2021/070926 | 4/2021 |

OTHER PUBLICATIONS

European Search Report received in Application No. 20875101.6, dated Aug. 21, 2023 in 7 pages.
International Search Report and Written Opinion of PCT/JP2020/038264, Dated Dec. 18, 2020 with English Translation in 5 pages.
International Preliminary Report on Patentability of PCT/JP2020/038264, Dated Apr. 23, 2021, in 10 pages.

* cited by examiner

FIG.11
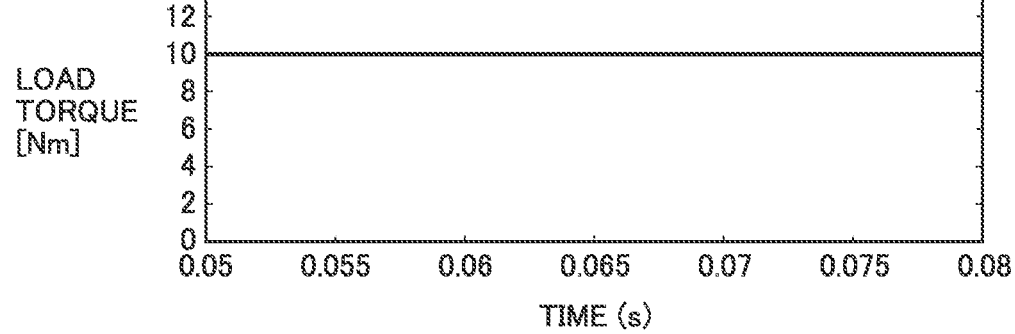
(A)
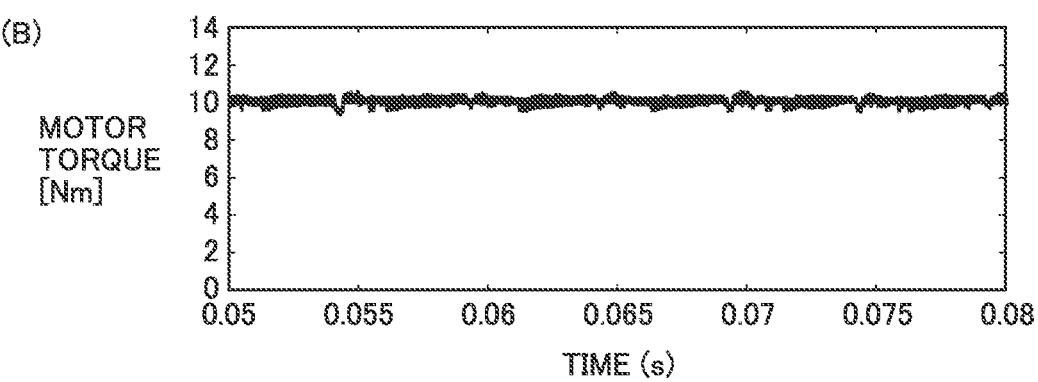
(B)
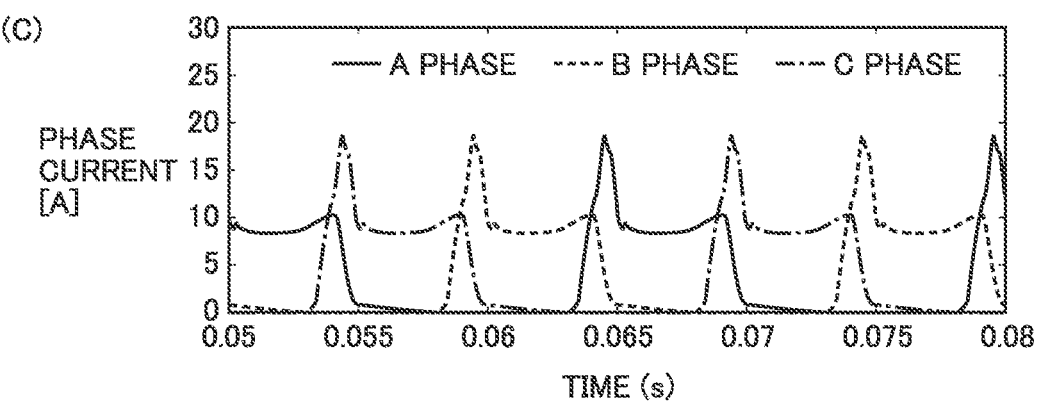
(C)

SWITCHED RELUCTANCE MOTOR AND CONTROL METHOD THEREFOR

TECHNICAL FIELD

The present disclosure relates to a switched reluctance motor and a control method therefor.

BACKGROUND ART

In order to improve a power factor and efficiency of a switched reluctance motor, a method of providing a permanent magnet in a stator yoke in addition to a drive winding provided on a stator salient pole is known.

For example, according to a method disclosed in PTL 1 (Japanese Patent Laying-Open No. 2018-174649), a permanent magnet serves as an excitation means and applies a magnetic force to stator salient poles through a magnetic path. The stator salient poles that attract rotor salient poles are switched by adding and subtracting the magnetic flux by the current of the drive winding to and from the magnetic flux by the permanent magnet.

CITATION LIST

Patent Literature

PTL 1: Japanese Patent Laying-Open No. 2018-174649

SUMMARY OF INVENTION

Technical Problem

In the switched reluctance motor disclosed in PTL 1, when the rotation speed and the load torque each have a predetermined value, it is conceivable that selecting a permanent magnet having a magnetic force corresponding to the values will allow an increase in power factor and efficiency. However, how to optimize the power factor and the efficiency when each of the values of the rotation speed and the load torque changes over a wide range is not clearly mentioned.

Typically, a neodymium magnet is used in motors. The neodymium magnet is high in coercivity, so that the magnetic force hardly changes in a normal use state. Therefore, when the neodymium magnet is applied to the switched reluctance motor having the above-described structure, the power factor and efficiency of the motor can be optimized only in a narrow operation range.

The present disclosure has been made in view of such problems. It is therefore an object of the present disclosure to provide a switched reluctance motor that is operable with an optimum power factor and efficiency over a wide rotation speed range and a wide load torque range.

Solution to Problem

A switched reluctance motor according to an embodiment includes a motor main body, a drive circuit, and a pulse current output circuit. The motor main body includes a rotor having a plurality of rotor salient poles, a stator having a plurality of stator salient poles and a permanent magnet, and a drive winding of each phase wound around stator salient poles of the plurality of stator salient poles, of the phase. The drive circuit outputs a drive current to the drive winding of each phase to rotate the rotor. The pulse current output circuit outputs a pulse current to the drive winding of any phase during an application time shorter than an application time of the drive current to the drive winding of each phase.

Advantageous Effects of Invention

According to the above-described embodiment, applying the pulse current allows a change in residual magnetic flux density of the permanent magnet, so that it is possible to provide the switched reluctance motor that is operable with an optimum power factor and efficiency over a wide rotation speed range and a wide load torque range.

BRIEF DESCRIPTION OF DRAWINGS

FIG. 11 is a diagram illustrating changes with time in load torque, motor torque, and current applied to each phase according to another embodiment.

DESCRIPTION OF EMBODIMENTS

Figure 1:
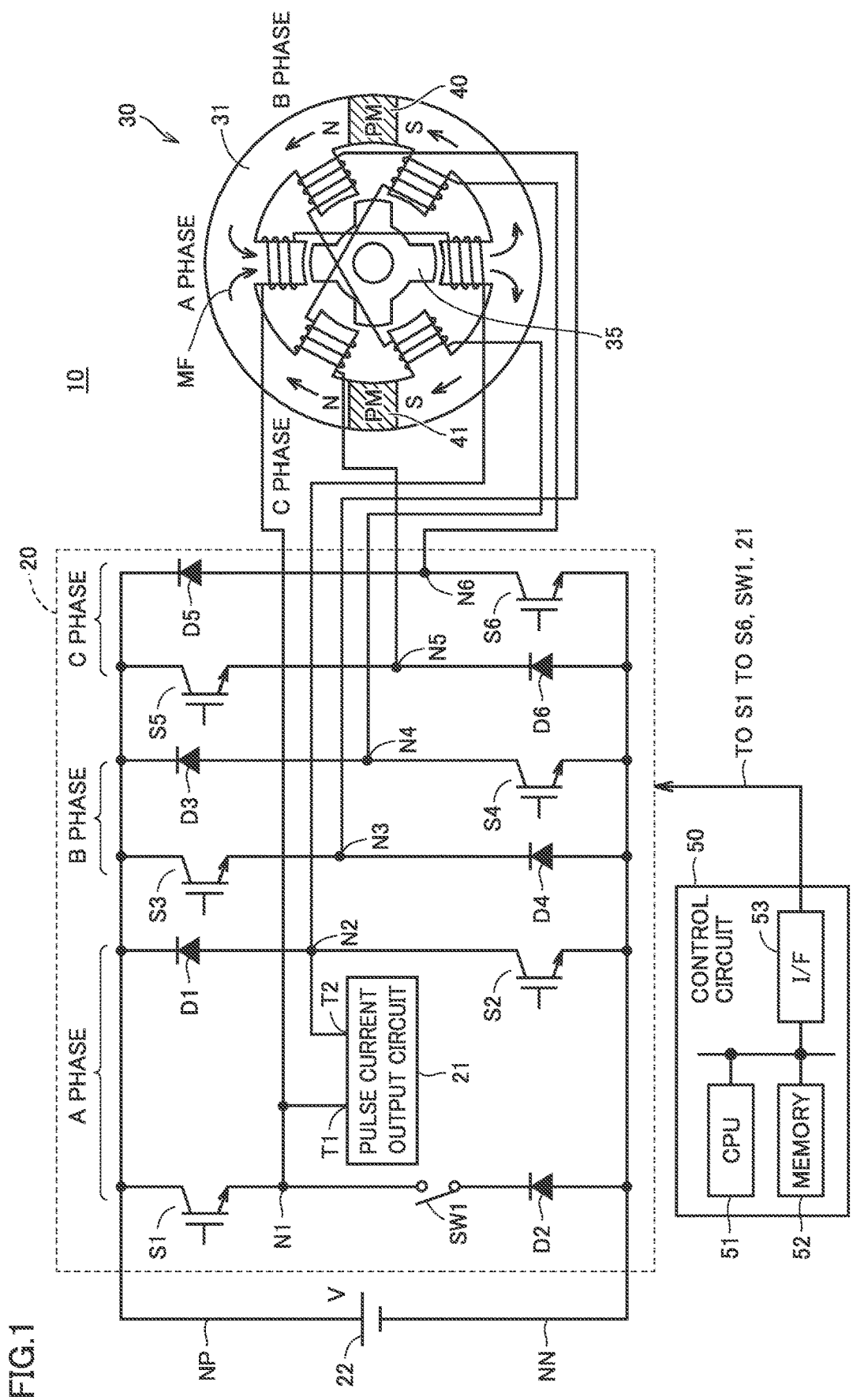
FIG. 1 is a block diagram illustrating an example of a structure of a switched reluctance motor according to a first embodiment.

A detailed description will be given below of each embodiment with reference to the drawings. Hereinafter, a switched reluctance motor including six stator poles and four rotor poles, a so-called 6/4 switched reluctance motor, will be described as an example. Note that the technology according to the present disclosure is also applicable to a switched reluctance motor having a different structure. In the following description, like or corresponding parts are denoted by like reference numerals and a description thereof will not be repeated.

First Embodiment

[Device Structure]

Figure 2:
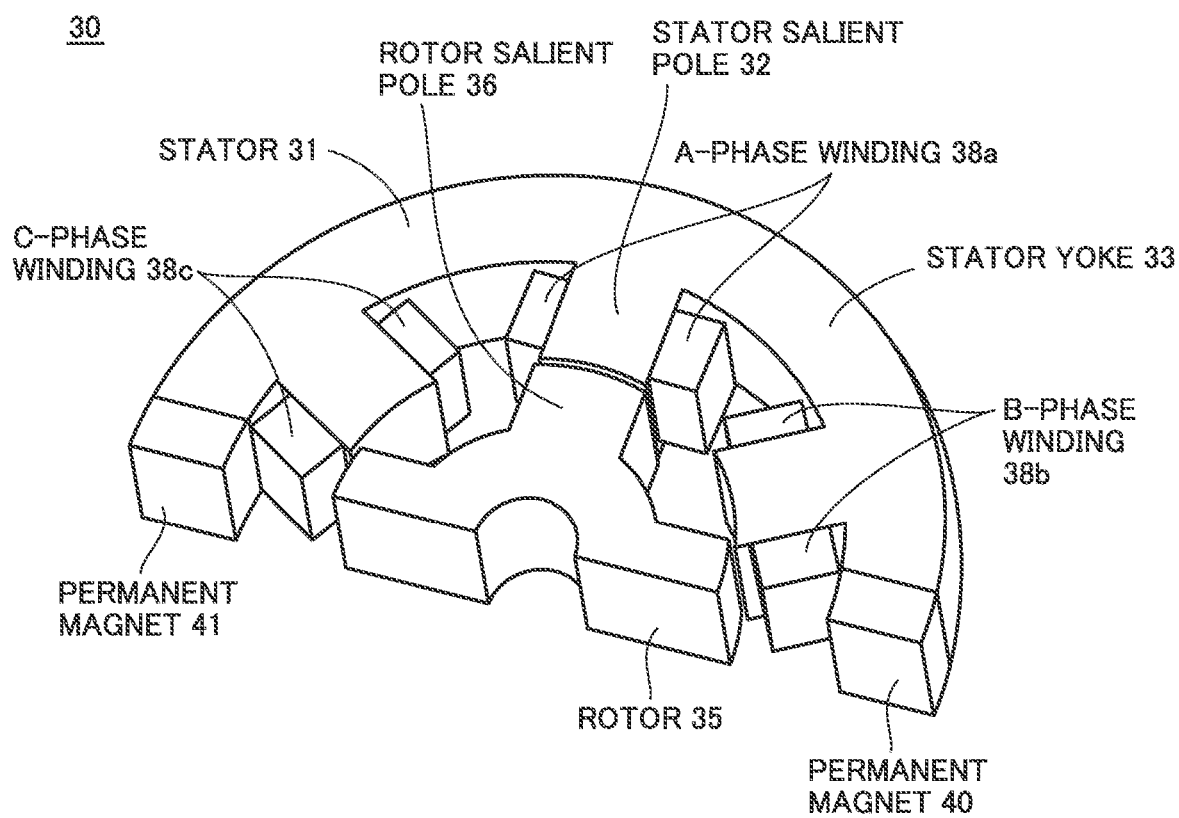
FIG. 2 is a perspective cross-sectional view of a motor main body illustrated in FIG. 1, taken along a plane of symmetry.

FIG. 1 is a block diagram illustrating an example of a structure of a switched reluctance motor according to a first embodiment. FIG. 2 is a perspective cross-sectional view of a motor main body illustrated in FIG. 1, taken along a plane of symmetry. Hereinafter, an example of a structure of a switched reluctance motor 10 according to the present embodiment will be described with reference to FIGS. 1 and 2.

Switched reluctance motor 10 includes a motor main body 30, a drive circuit 20, and a control circuit 50. Drive circuit 20 outputs an excitation current to drive motor main body 30. Control circuit 50 controls the operation of drive circuit 20.

(Motor Main Body)

As illustrated in FIGS. 1 and 2, motor main body 30 includes a rotor 35 that rotates about a rotary shaft, a stator 31 disposed to surround rotor 35, and drive windings 38 (38a, 38b, 38c).

In a so-called 6/4 motor main body, rotor 35 includes four rotor salient poles 36 that are arranged at intervals of 90 degrees and protrude toward stator 31. Stator 31 includes an annular stator yoke 33 and six stator salient poles 32 that are arranged at intervals of 60 degrees and protrude from stator yoke 33 toward rotor 35. A pair of opposite stator salient poles 32 has a corresponding phase drive winding 38 (A-phase winding 38a, B-phase winding 38b, or C-phase winding 38c) wound therearound.

Motor main body 30 further includes a pair of permanent magnets 40, 41 provided in stator yoke 33. As illustrated in FIGS. 1 and 2, permanent magnets 40, 41 are each provided at a position separated by 90 degrees from A-phase stator salient pole 32, that is, at an intermediate position between B-phase stator salient pole 32 and C-phase stator salient pole 32 adjacent to each other. Permanent magnets 40, 41 are each interposed between a first portion of stator yoke 33 and a second portion of stator yoke 33. This causes a magnetic path in stator yoke 33 to pass through permanent magnets 40, 41.

As permanent magnets 40, 41, magnets such as an alnico (AlNiCo) magnet and an iron-chromium-cobalt magnet are preferably used. Such magnets are about the same in residual magnetic flux density as a neodymium magnet, but have coercivity less than or equal to about one-tenth of the coercivity of the neodymium magnet. It is therefore possible to easily change a magnetic force by changing an external magnetic field.

Figure 3:
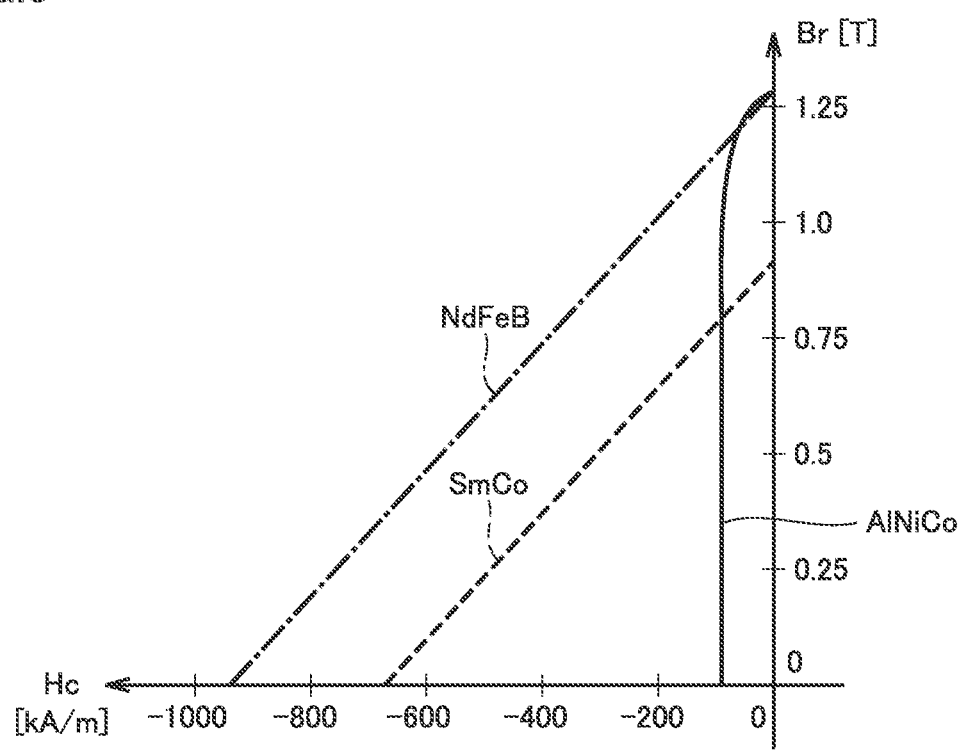
FIG. 3 is a diagram illustrating B-H curves of various magnets.

FIG. 3 is a diagram illustrating B-H curves of various magnets. In FIG. 3, the horizontal axis represents an external magnetic field Hc (unit: kA/m), and the vertical axis represents a magnetic flux density Br (unit: T). FIG. 3 illustrates examples of B-H curves of a neodymium (NdFeB) magnet, a samarium-cobalt (SmCo) magnet, and an alnico (AlNiCo) magnet.

As illustrated in FIG. 3, the alnico magnet is about the same in magnetic force as a rare-earth magnet such as the neodymium magnet and the samarium-cobalt magnet. The alnico magnet has a maximum magnetic flux density of about 0.5 to 1.2 T, which is about the same as a maximum magnetic flux density of the neodymium magnet. On the other hand, the alnico magnet has coercivity of about 50 to 150 KA/m, which is less than or equal to about one-tenth of coercivity of such a rare-earth magnet.

Although not illustrated in FIG. 3, the iron-chromium-cobalt magnet has a maximum magnetic flux density of about 0.5 to 1.2 T, which is about the same as the maximum magnetic flux density of the alnico magnet. Further, the iron-chromium-cobalt magnet has coercivity of about 30 to 70 KA/m, which is about the same as or slightly less than the coercivity of the alnico magnet.

In motor main body 30 of switched reluctance motor 10 according to the present embodiment, cast magnets such as the alnico magnet and the iron-chromium-cobalt magnet are used as permanent magnets 40, 41. This allows, with a magnetic force as strong as that of the rare-earth magnet provided, the magnetic force to change by means of the pulse current applied to drive winding 38.

(Drive Circuit)

With reference to FIGS. 1 and 2 again, drive circuit 20 is an asymmetric half-bridge converter. Drive circuit 20 converts a DC voltage V output from a DC power supply 22 into a three-phase pulse voltage for driving motor main body 30.

Drive circuit 20 includes self turn-off type semiconductor switching elements S1 to S6, diodes D1 to D6, and a switch SW1. In FIG. 1, an insulated gate bipolar transistor (IGBT) is used as an example of the semiconductor switching elements S1 to S6. Hereinafter, a connection relationship among such components will be described. As switch SW1, a self turn-off type semiconductor switching element may also be used.

Semiconductor switching element S1 is connected between a connection node N1 connected to one end of A-phase winding 38a and a positive node NP of DC power supply 22. Semiconductor switching element S2 is connected between a connection node N2 connected to the other end of A-phase winding 38a and a negative node NN of DC power supply 22. Diode D1 is connected in reverse bias condition between connection node N2 and positive node NP of DC power supply 22. Diode D2 is connected in reverse bias condition between connection node N1 and negative node NN of DC power supply 22.

Similarly, semiconductor switching element S3 is connected between a connection node N3 connected to one end of B-phase winding 38b and positive node NP of DC power supply 22. Semiconductor switching element S4 is connected between a connection node N4 connected to the other end of B-phase winding 38b and negative node NN of DC power supply 22. Diode D3 is connected in reverse bias condition between connection node N4 and positive node NP of DC power supply 22. Diode D4 is connected in reverse bias condition between connection node N3 and negative node NN of DC power supply 22.

Similarly, semiconductor switching element S5 is connected between a connection node N5 connected to one end of C-phase winding 38c and positive node NP of DC power supply 22. Semiconductor switching element S6 is connected between a connection node N6 connected to the other end of C-phase winding 38c and negative node NN of DC power supply 22. Diode D5 is connected in reverse bias condition between connection node N6 and positive node NP of DC power supply 22. Diode D6 is connected in reverse bias condition between connection node N5 and negative node NN of DC power supply 22.

Drive circuit 20 further includes a pulse current output circuit 21. In order to cause permanent magnets 40, 41 to change their magnetization state by means of the external magnetic field, pulse current output circuit 21 applies a pulse current to a winding wound around stator 31 for a time that is not long enough for rotor 35 to be driven to rotate. According to the present embodiment, rather than providing a special winding to which the pulse current is applied, the pulse current is applied to at least one phase winding of drive windings 38.

In an example illustrated in FIG. 1, pulse current output circuit 21 is connected between A-phase connection nodes N1, N2. In this case, switch SW1 is connected between connection node N1 and a cathode of diode D2, or between connection node N2 and an anode of diode D1. In order to cause the drive current for driving rotor 35 to flow through A-phase winding 38a, switch SW1 is controlled into an ON state. On the other hand, in order to cause the pulse current to flow from pulse current output circuit 21 to A-phase winding 38a, switch SW1 and semiconductor switching elements S1, S2 are all controlled into an OFF state.

Specifically, pulse current output circuit 21 has an output terminal T1 connected to connection node N1 and an output terminal T2 connected to connection node N2. When the pulse current is output with the polarity of output terminal T1 set positive and the polarity of output terminal T2 set negative, the current flows through A-phase winding 38a in the same direction as the direction of the drive current for driving rotor 35. On the other hand, when the pulse current is output with the polarity of output terminal T1 set negative and the polarity of output terminal T2 set positive, the current flows through A-phase winding 38a in a direction opposite to the direction of the drive current.

The magnitude of the magnetic force of permanent magnets 40, 41 can be adjusted by the magnitude of the pulse current applied from pulse current output circuit 21 and the application time. Details of the application time and timing of the pulse current will be described later.

(Control Circuit)

Control circuit 50 outputs a gate control signal to control an open/close state of semiconductor switching elements S1 to S6. Control circuit 50 further controls an open/close state of switch SW1. Control circuit 50 further controls the magnitude and timing of the pulse current output from pulse current output circuit 21. Control circuit 50 further controls, when the pulse current is not output from pulse current output circuit 21, pulse current output circuit 21 to set output terminal T1 and output terminal T2 into a high-impedance state or an open state. Alternatively, control circuit 50 may interrupt, when the pulse current is not output from pulse current output circuit 21, the supply of a power supply voltage to pulse current output circuit 21 or an output driver of pulse current output circuit 21.

In the example illustrated in FIG. 1, control circuit 50 is a computer-based circuit. That is, control circuit 50 includes a central processing unit (CPU) 51, a memory 52, and an interface (I/F) circuit 53. Control circuit 50 may be based on a circuit such as an application specific integrated circuit (ASIC) or a field programmable gate array (FPGA).

Specifically, in the example illustrated in FIG. 1, CPU 51 controls semiconductor switching elements S1 to S6, pulse current output circuit 21, and switch SW1 by executing instructions in accordance with a control program. Memory 52 includes a random access memory (RAM) and a read only memory (ROM) serving as a primary storage of CPU 51, a non-volatile memory and a secondary storage device for storing the above-described control program, and the like. Interface circuit 53 includes a drive circuit and the like, and outputs the gate control signal to gate terminals of semiconductor switching elements S1 to S6. Further, interface circuit 53 outputs a control signal to control pulse current output circuit 21 and switch SW1.

[Operation Method]

Next, how switched reluctance motor 10 having the above-described structure operates will be described. First, rotor 35 is driven to rotate in the same manner as the method in the related art.

For example, when control circuit 50 controls both A-phase semiconductor switching elements S1, S2 into the ON state, power is supplied to A-phase winding 38a to magnetize and demagnetize A-phase stator salient pole 32. This also causes permanent magnets 40, 41 to change their magnetization states.

Control circuit 50 controls, when power supply to A-phase winding 38a is not required, semiconductor switching elements S1, S2 into the OFF state. For example, when semiconductor switching element S1 is controlled into the OFF state, the magnetic energy stored in A-phase winding 38a causes a current to circulate through semiconductor switching element S2 and diode D2. Conversely, when semiconductor switching element S2 is controlled into the OFF state, the magnetic energy stored in A-phase winding 38a causes a current to circulate through semiconductor switching element S1 and diode D1. In either case, no power is supplied from DC power supply 22.

When control circuit 50 controls both semiconductor switching elements S1, S2 into the OFF state, a current flows through diodes D1, D2. This causes the magnetic energy stored in A-phase winding 38a to return to DC power supply 22. A voltage opposite in polarity to a voltage applied during power supply is applied across both the ends of A-phase winding 38a, and a winding current gradually decreases accordingly.

In FIG. 1, in order to rotate rotor 35 in the counterclockwise direction, control circuit 50 causes drive circuit 20 to supply power to A-phase winding 38a, B-phase winding 38b, and C-phase winding 38c in this order. This produces an electromagnetic field whose magnetic flux direction changes every 120 degrees of the electric angle. In order to rotate rotor 35 in the clockwise direction, control circuit 50 causes drive circuit 20 to supply power to A-phase winding 38a, C-phase winding 38c, and B-phase winding 38b in this order.

Specifically, FIG. 1 illustrates an example where A-phase stator salient pole 32 and rotor salient pole 36 are aligned. In order to rotate rotor 35 in the counterclockwise direction, control circuit 50 switches, at this timing, the control from the state where power is supplied to A-phase winding 38a to the state where power is supplied to B-phase winding 38b. Conversely, in order to rotate rotor 35 in the clockwise direction, control circuit 50 switches, at this timing, the control from the state where power is supplied to A-phase winding 38a to the state where power is supplied to C-phase winding 38c.

With reference to the example illustrated in FIG. 1, an initial position of rotor 35 when the drive current is first applied to A-phase winding 38a to rotate rotor 35 in the counterclockwise direction will be described. In this case, any one of rotor salient poles 36 of rotor 35 needs to be positioned between A-phase stator salient pole 32 and B-phase stator salient pole 32 as the initial position. For example, any one of rotor salient poles 36 of rotor 35 is placed at a position 40 to 45 degrees away from A-phase stator salient pole 32. When the drive current is first applied to A-phase winding 38a to rotate rotor 35 in the clockwise direction, any one of rotor salient poles 36 of rotor needs to be positioned between A-phase stator salient pole 32 and C-phase stator salient pole 32 as the initial position.

Next, how pulse current output circuit 21 operates will be described. When stator salient pole 32 of a specific phase determined in accordance with the arrangement positions of permanent magnets 40, 41 and any one of rotor salient poles 36 are aligned, pulse current output circuit 21 supplies the pulse current to at least drive winding 38 wound around stator salient pole 32 of the specific phase.

Specifically, in the example illustrated in FIGS. 1 and 2, permanent magnets 40, 41 are each provided at an intermediate position between B-phase stator salient pole 32 and C-phase stator salient pole 32 adjacent to each other in stator yoke 33. That is, the pair of permanent magnets 40, 41 are provided at symmetrical positions with respect to A-phase stator salient pole 32. In this case, when A-phase stator salient pole 32 and any one of rotor salient poles 36 are aligned, the pulse current is supplied from pulse current output circuit 21 to A-phase winding 38a with semiconductor switching elements S1, S2 in the OFF state. This forms, as illustrated in FIG. 1, a magnetic circuit extending through A-phase stator salient pole 32, rotor 35, stator yoke 33, and permanent magnets 40, 41, thereby allowing an increase or decrease in magnetic force of permanent magnets 40, 41 with high efficiency.

Here, when the pulse current is injected in the same direction as the direction of the drive current, the magnetic force of permanent magnets 40, 41 increases, and when the pulse current is injected in a direction opposite to the direction of the drive current, the magnetic force of permanent magnets 40, 41 decreases. Specifically, in the example illustrated in FIG. 1, output terminal T1 and output terminal T2 of pulse current output circuit 21 are set into the high-impedance state or open state, and switch SW1 is set into the ON state. In this state, when both semiconductor switching elements S1, S2 are set into the ON state to apply the drive current to A-phase winding 38a, a magnetic flux MF is generated in a direction indicated by an arrow in FIG. 1. In this case, as illustrated in FIG. 1, permanent magnets 40, 41 have their upstream sides of magnetic flux MF magnetized into the S pole and have their downstream sides of magnetic flux MF magnetized into the N pole.

Next, both semiconductor switching elements S1, S2 are set into the OFF state, and switch SW1 is set into the OFF state. In this state, when the pulse current is output from pulse current output circuit 21 with the polarity of output terminal T1 set positive and the polarity of output terminal T2 set negative, the pulse current flows in the same direction as the direction of the drive current. This generates a magnetic flux in the same direction as the direction illustrated in FIG. 1, so that the amount of magnetization of permanent magnets 40, 41 can be increased. Conversely, when both semiconductor switching elements S1, S2 and switch SW1 are set into the OFF state, and the pulse current is output from pulse current output circuit 21 with the polarity of output terminal T1 set negative and the polarity of output terminal T2 set positive, the pulse current flows in a direction opposite to the direction of the drive current. This generates a magnetic flux in a direction opposite to the direction illustrated in FIG. 1, so that the amount of magnetization of permanent magnets 40, 41 can be decreased.

When the timing of applying the pulse current is different from the above, the generation of torque ripple possibly causes rotor 35 to vibrate and in turn interferes with stable operation of the motor.

With rotor 35 in the normal drive state, the current magnetic field of drive winding 38 is superimposed on the magnetic field produced by permanent magnets 40, 41 (effect of increasing the magnetic force). Changing the magnetic force of permanent magnets 40, 41 using the pulse current as described above allows magnetic flux MF generated in the magnetic circuit to largely change. It is therefore possible to change or adjust the output torque of the motor to an appropriate value in accordance with variations in load torque.

It is required that the application time of the current pulse from pulse current output circuit 21 be set to a time that is not long enough for rotor 35 to rotate. It is therefore required that a pulse application time $T_p$ be set much longer than an electrical time constant $\tau_c$, but much shorter than a mechanical time constant $\tau_m$. When pulse application time $T_p$ is not much longer than electrical time constant $\tau_c$, the pulse current cannot be injected into A-phase winding 38a. Further, when pulse application time $T_p$ is not much shorter than mechanical time constant $\tau_m$, a large torque ripple may be generated in the motor output, or rotor 35 may vibrate, which interferes with stable operation of the motor.

Here, as shown in the following equation (1), electrical time constant $\tau_c$ is calculated from an average inductance L of each phase of motor main body 30 and a resistance value R of drive winding 38 of each phase as follows:

$$\tau_c = L/R \qquad (1).$$

As shown in the following equation (2), mechanical time constant $\tau_m$ is calculated from a moment of inertia J of rotor 35 and a damping coefficient B as follows:

$$\tau_m = J/B \qquad (2).$$

Therefore, pulse application time $T_p$ needs to satisfy:

$$\tau_c \ll T_p \ll \tau_m \qquad (3).$$

Table 1 shows a specific design example of mechanical time constant $\tau_m$ and electrical time constant $\tau_c$. Pulse application time $T_p$ is set to, for example, a value greater than 10 times electrical time constant $\tau_c$ and less than one-tenth of mechanical time constant $\tau_m$ (about 0.5 seconds to 2 seconds in the example shown in Table 1).

TABLE 1

| Constants | |
|---|---|
| Constant name | Examples of numerical values |
| Phase resistance R | 0.78Ω |
| Phase inductance L (alignment position) | Max: 0.5H Min: 0.03H |
| Phase inductance L (misalignment position) | Max: 0.032H Min: 0.0066H |
| Phase inductance L (average value at 10 A) | 0.0349H |
| Moment of inertia J | 0.00325 kgm² |
| Damping coefficient B | 0.00156 Nms/rad |
| Electrical time constant $\tau_e = L/R$ | 0.0349/0.78 = 0.0447 s |
| Mechanical time constant $\tau_m = J/B$ | 0.00325/0.00156 = 2.08 s |

Specific Example of Switching Timing

Figure 4:
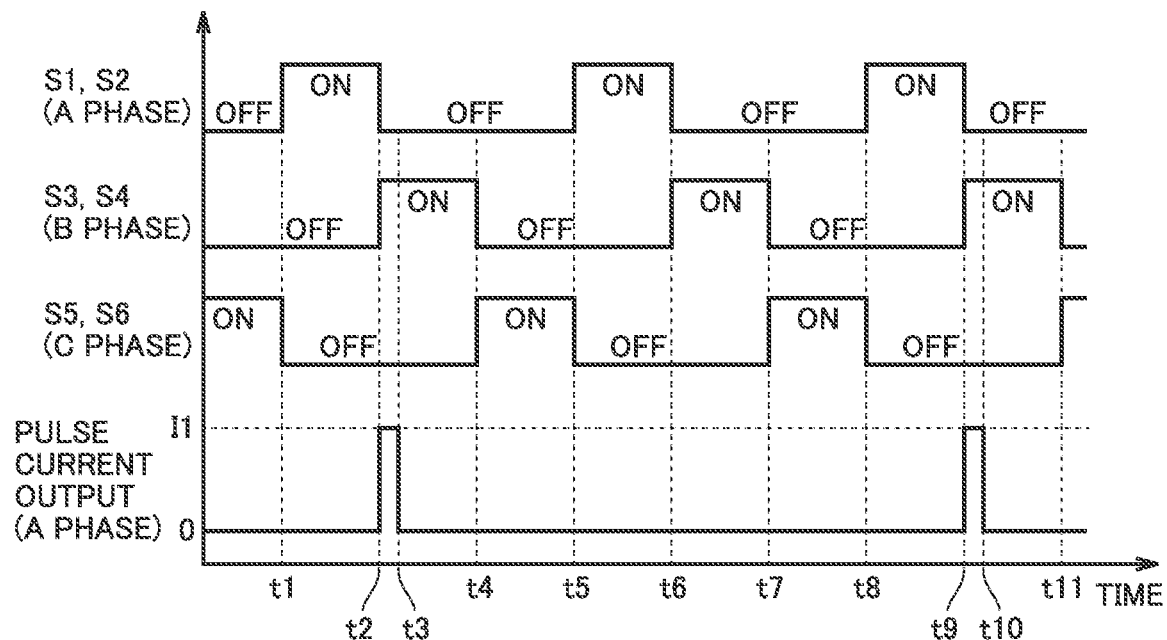
FIG. 4 is a timing chart of an opening/closing timing of each semiconductor switching element and an output timing of a pulse current output circuit.

Hereinafter, a specific example of how semiconductor switching elements S1 to S6 and pulse current output circuit 21 constituting drive circuit 20 are controlled will be described with reference to FIGS. 1 and 4. The polarity of output terminal T1 of pulse current output circuit 21 is set positive, and the polarity of output terminal T2 is set negative. In this case, switch SW1 may be always in the ON state. [0054] FIG. 4 is a timing chart of an opening/closing timing of each semiconductor switching element and an output timing of the pulse current output circuit. At time t1 in FIG. 4, control circuit 50 switches semiconductor switching elements S1, S2 to the ON state. This causes the drive current to be applied to A-phase winding 38a.

At the next time t2, control circuit 50 switches semiconductor switching elements 51, S2 to the OFF state and switches semiconductor switching elements S3, S4 to the ON state. This terminates the application of the drive current to A-phase winding 38a and starts the application of the drive current to B-phase winding 38b. At time t2, A-phase winding 38a and any one of rotor salient poles 36 of rotor 35 are nearly aligned. Between time t2 and time t3 with this alignment position maintained, pulse current output circuit 21 outputs the pulse current to A-phase winding 38a in accordance with a command from control circuit 50. This causes the pulse current to flow through A-phase winding 38a and to be superimposed on the residual current of the drive current, thereby adjusting the magnetization of permanent magnets 40, 41. Specifically, when the pulse current flows in the same direction as the direction of the residual current of the drive current, the amount of magnetization of permanent magnets 40, 41 increases, and when the pulse current flows in a direction opposite to the direction of the residual current of the drive current, the amount of magnetization of permanent magnets 40, 41 decreases. When the pulse current is injected into A-phase winding 38a, control circuit 50 controls semiconductor switching elements S1, S2 into the OFF state and controls switch SW into the OFF state. At this time, semiconductor switching elements S3, S4 may be controlled into the ON state or the OFF state.

At next time t4, control circuit 50 switches semiconductor switching elements S3, S4 to the OFF state and switches semiconductor switching elements S5, S6 to the ON state. This terminates the application of the drive current to B-phase winding 38b and starts the application of the drive current to C-phase winding 38c.

Thereafter, at time t5, the destination of application of the drive current is switched from C-phase winding 38c to A-phase winding 38a in the same manner as described above. At time t6, the destination of application of the drive current is switched from A-phase winding 38a to B-phase winding 38b. At time t7, the destination of application of the drive current is switched from B-phase winding 38b to C-phase winding 38c. At time t8, the destination of application of the drive current is switched from C-phase winding 38c to A-phase winding 38a. At time t9, the destination of application of the drive current is switched from A-phase winding 38a to B-phase winding 38b.

Between time t9 and time t10, pulse current output circuit 21 outputs the pulse current to A-phase winding 38a in accordance with a command from control circuit 50 in the same manner as between time t2 and time t3. This causes the pulse current to flow through A-phase winding 38a and to be superimposed on the residual current of the drive current, thereby adjusting the magnetization of permanent magnets 40, 41. Thereafter, at time t11, the destination of application of the drive current is switched from B-phase winding 38b to C-phase winding 38c.

First Simulation Example

A result of a numerical simulation will be described below. First, a result in a case where pulse current output circuit 21 is out of operation with permanent magnets 40, 41 illustrated in FIG. 1 fully magnetized will be described. Alnico magnets were used as permanent magnets 40, 41.

The output power increased from about 600 W to about 1200 W with a rotation speed of 1200 rpm as compared with a case where no permanent magnets 40, 41 are provided. The efficiency increased from about 80% to about 90%. The power factor increased from 0.35 to 0.55 with a rotation speed of 1200 rpm. It was confirmed that providing permanent magnets 40, 41 allows increases in the power, the efficiency, and the power factor.

Second Simulation Example

Next, a result of a numerical simulation when the pulse current is applied from pulse current output circuit 21 to drive winding 38 will be described with reference to FIGS. 5 and 6. Alnico magnets were used as permanent magnets 40, 41. The residual magnetic flux density of the alnico magnets is set to zero in the initial state.

Figure 5:
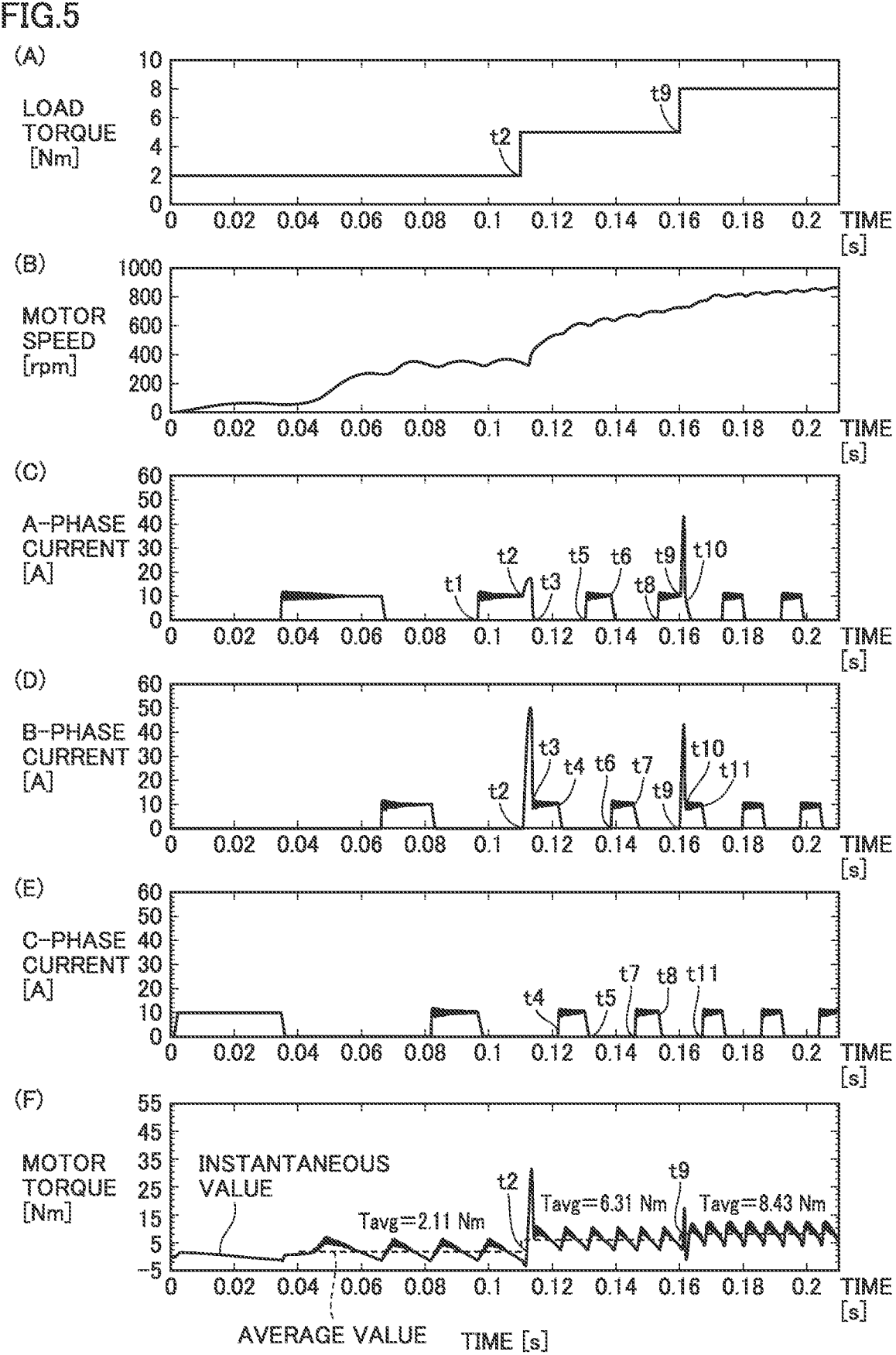
FIG. 5 is a diagram illustrating changes with time in load torque, motor speed, current applied to each phase, and motor torque.

FIG. 5 is a diagram illustrating changes with time in load torque, motor speed, current applied to each phase, and motor torque. FIG. 6 is a diagram illustrating changes in magnetization state of the permanent magnets on a B-H diagram based on the example illustrated in FIG. 5. In FIG. 5, time t1 to t11 representing the switching timing of semiconductor switching elements S1 to S6 and the output timing of the pulse current of pulse current output circuit 21 correspond to time t1 to t11 in FIG. 4, respectively.

As illustrated in FIG. 5, the load torque increases at time t2 and time t9, so that the average value of the output torque of the motor is increased accordingly. For this purpose, the pulse current is output from pulse current output circuit 21 to A-phase winding 38a between time t2 and time t3 and between time t9 and time t10. This causes an increase in the residual magnetic flux density of permanent magnets 40, 41.

Figure 6:
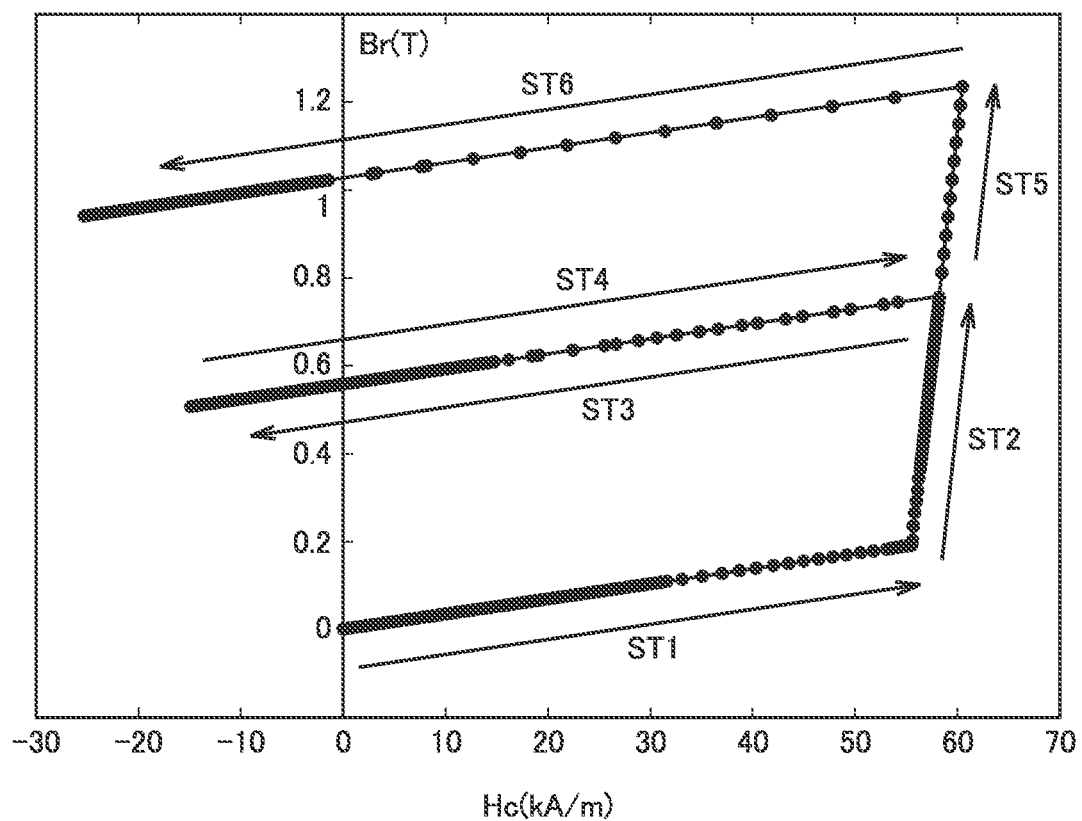
FIG. 6 is a diagram illustrating changes in magnetization state of permanent magnets on a B-H diagram based on the example illustrated in FIG. 5.

In the example illustrated in FIGS. 5 and 6, the pulse current is also applied from another pulse current output circuit (not illustrated in FIG. 1) to B-phase winding 38b at the same timing Note that A-phase stator salient pole 32 and any one of rotor salient poles 36 are aligned, so that a change in the magnetic force of permanent magnets 40, 41 is mainly caused by the injection of the pulse current into A-phase winding 38a. The injection of current into B-phase winding 38b is merely support for the change in the magnetic force of permanent magnets 40, 41.

As illustrated in FIG. 6, the first injection of the pulse current between time t2 and time t3 causes the magnetization state of the permanent magnets to change in the order of states ST1, ST2, ST3. The next injection of the pulse current between time t9 to time t10 causes the magnetization state of the permanent magnets to further change in the order of states ST4, ST5, ST6. As described above, the injection of the pulse current into A-phase winding 38a and B-phase winding 38b allows the magnetic force of permanent magnets 40, 41 to change.

In the above example, the average torque of the motor is larger than the load torque. Specifically, while the load torque increases to 2, 5, and 8 [Nm], the average torque of the motor changes to 2.11, 6.31, and 8.43 [Nm]. This result shows that, considering that whether the motor torque can be increased when the load torque is increased indicates the performance of the motor, applying the pulse current as shown in the above causes the motor torque to increase by about 10 to 20% in accordance with the increase in the load torque. Therefore, applying the pulse current with a pulse width greater than or equal to a predetermined value allows an increase in motor torque and further allows an increase in efficiency.

In the above case, the motor speed increases due to a difference in energy between the load torque and the average torque of the motor. When the magnitude of the pulse current output from pulse current output circuit 21 is adjusted to make the average value of the motor torque equal to the load torque, it is also possible to perform control so as to make the motor speed nearly constant.

Third Simulation Example

Next, as with the second simulation example, a result of a numerical simulation when the pulse current is applied from pulse current output circuit 21 to drive winding 38 will be described with reference to FIG. 7. The magnitude of the drive current applied to each phase was set to 10 A, and the rotation speed of the motor was set to 500 [rpm]. Further, alnico magnets were used as permanent magnets 40, 41.

Figure 7:
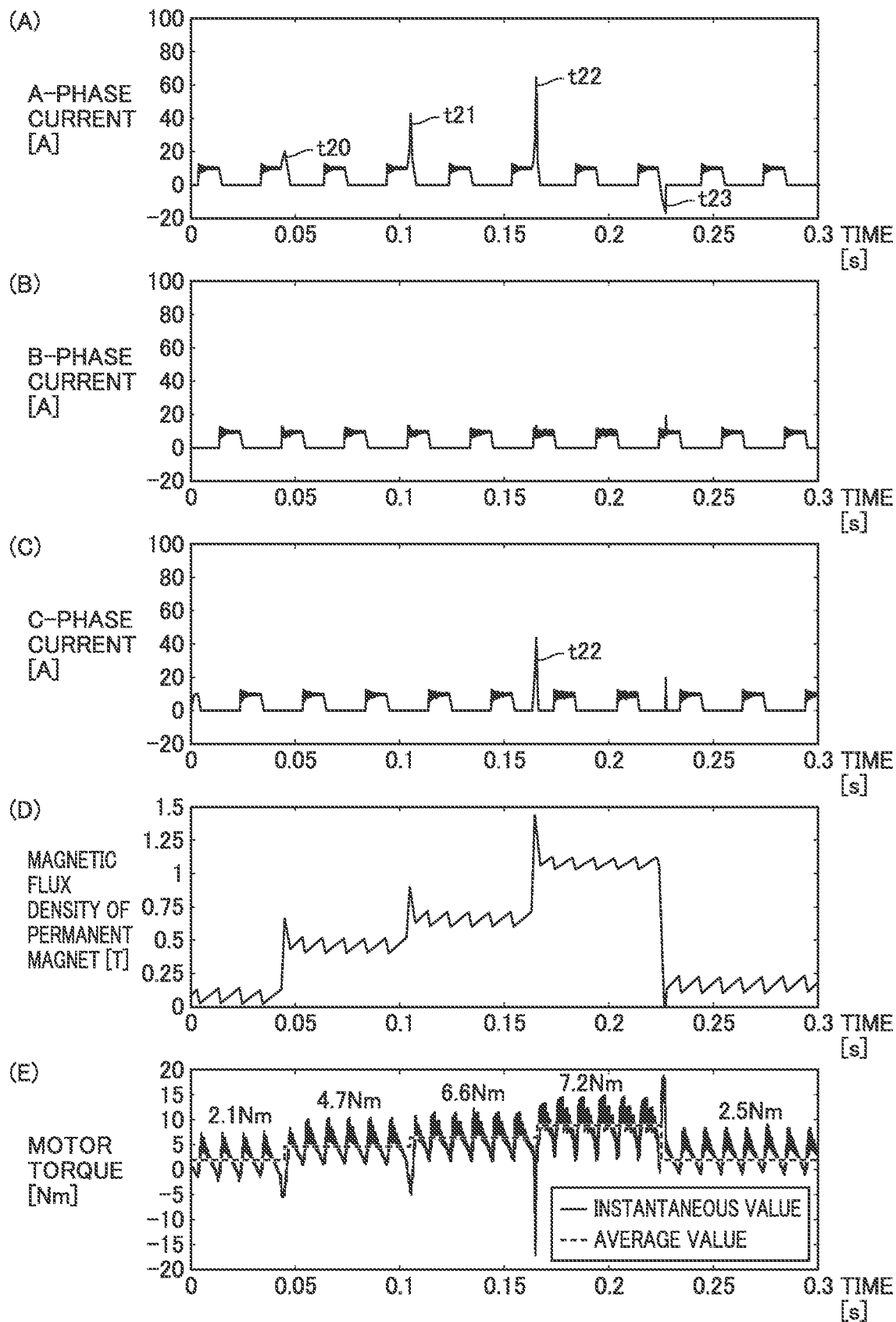
FIG. 7 is a diagram illustrating changes with time in current applied to each phase, magnetic flux density of the permanent magnet, and motor torque based on another simulation example.

FIG. 7 is a diagram illustrating changes with time in current applied to each phase, magnetic flux density of the permanent magnets, and motor torque based on another simulation example. In FIG. 7, the pulse current is output from pulse current output circuit 21 at about times t20, t21, t22, t23.

Specifically, at about time t20 and time t21, pulse current output circuit 21 applies the pulse current to A-phase winding 38*a* in the same direction as the direction of the drive current. This causes the average value of the magnetic flux density of permanent magnets 40, 41 to increase step by step and also causes the average value of the motor torque to increase step by step.

Near at next time t22, pulse current output circuit 21 applies the pulse current to A-phase winding 38*a* in the same direction as the direction of the drive current, and at the same time, another pulse current output circuit (not illustrated in FIG. 1) applies the pulse current to C-phase winding 38*c* in the same direction as the direction of the drive current. This causes the average value of the magnetic flux density of permanent magnets 40, 41 to further increase and also causes the average value of the motor torque to further increase.

At about next time t23, pulse current output circuit 21 applies the pulse current to A-phase winding 38*a* in a direction opposite to the direction of the drive current. This causes the average value of the magnetic flux density of permanent magnets 40, 41 to decrease and also causes the average value of the motor torque to decrease. As described above, applying the pulse current from pulse current output circuit 21 to drive winding 38 in a direction opposite to the direction of the drive current allows a decrease in the magnetic flux density of permanent magnets 40, 41 and thus allows a decrease in the motor torque.

Effects of First Embodiment

As described above, in the switched reluctance motor according to the first embodiment, the permanent magnet having small coercivity, such as an alnico magnet or an iron-chromium-cobalt magnet, is provided in the stator yoke. Then, when stator salient pole 32 of a specific phase determined in accordance with the arrangement position of the permanent magnet and any one of rotor salient poles 36 are aligned, the pulse current is applied to at least drive winding 38 of the specific phase. The application time of the pulse current is shorter than the application time of the drive current of each phase, and is restricted to a time that is not long enough for rotor 35 to rotate. The pulse current is larger in magnitude than the drive current. Applying the pulse current allows the residual magnetic flux density of the permanent magnet to change, thereby allowing an increase in the output and efficiency of the motor.

Second Embodiment

A switched reluctance motor 10 according to a second embodiment is the same in arrangement of permanent magnets 40, 41 as the first embodiment, but is different from the first embodiment in that the pulse current is applied to drive winding 38 of a phase other than the A phase. A detailed description will be given below with reference to FIGS. 8 to 10.

[Device Structure]

Figure 8:
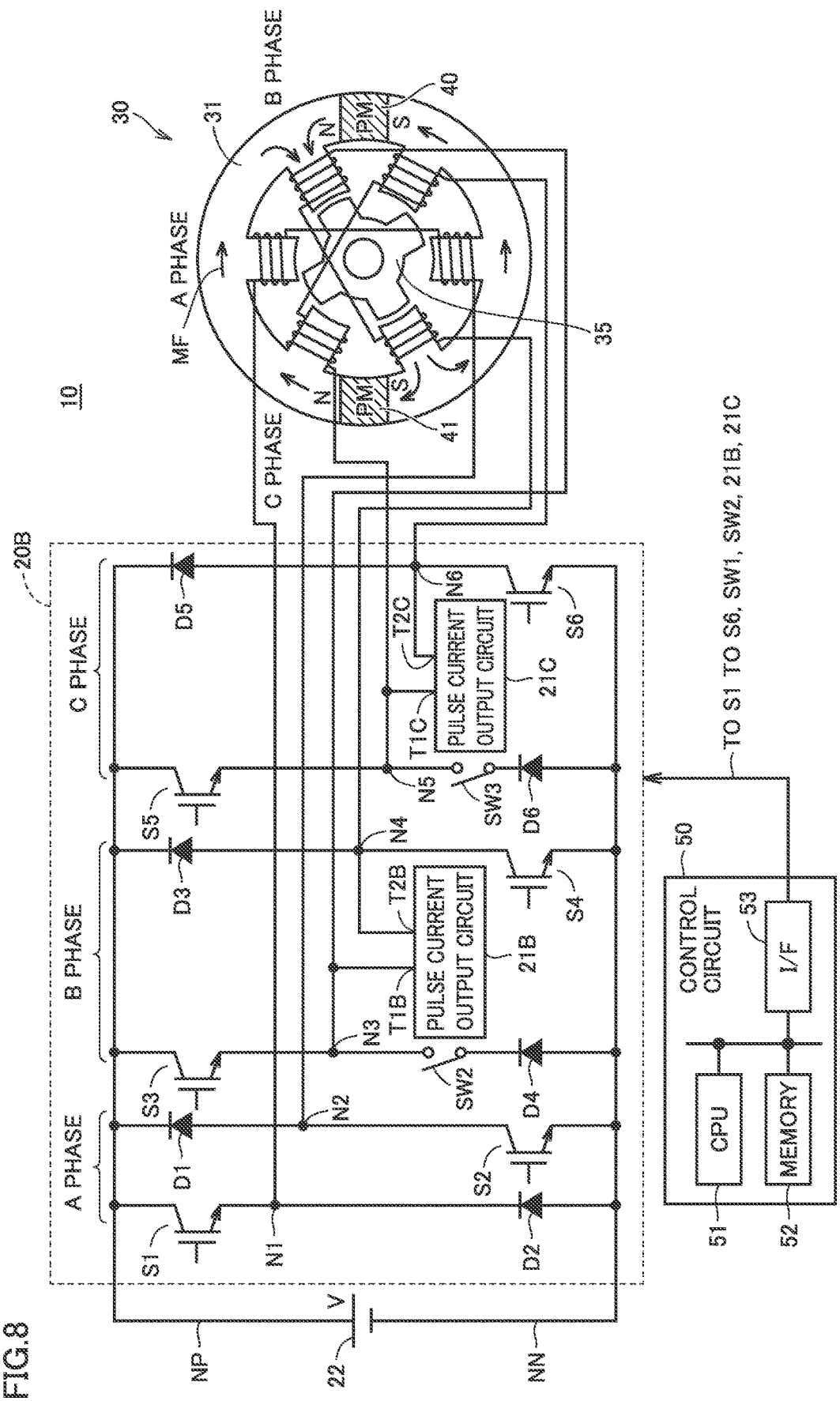
FIG. 8 is a block diagram illustrating an example of a structure of a switched reluctance motor according to a second embodiment.

FIG. 8 is a block diagram illustrating an example of a structure of the switched reluctance motor according to the second embodiment.

A drive circuit 20B of switched reluctance motor 10 illustrated in FIG. 8 is different from the drive circuit of switched reluctance motor 10 illustrated in FIG. 1 in that a B-phase pulse current output circuit 21B and a B-phase switch SW2, and a C-phase pulse current output circuit 21C and a C-phase switch SW3 are provided instead of A-phase pulse current output circuit 21 and A-phase switch SW1. Alternatively, a structure where the output destination of a common pulse current output circuit 21 is switchable may be employed.

Specifically, B-phase pulse current output circuit 21B has an output terminal T1B connected to a connection node N3 and an output terminal T2B connected to a connection node N4. Switch SW2 is connected between connection node N3 and a cathode of diode D4 or between connection node N4 and an anode of diode D3.

Pulse current output circuit 21B outputs the pulse current to B-phase winding 38*b* with switch SW2 and semiconductor switching elements S3, S4 controlled into the OFF state. When the pulse current is output from pulse current output circuit 21B with the polarity of output terminal T1B set positive and the polarity of output terminal T2B set negative, the pulse current is applied to B-phase winding 38*b* in the same direction as the direction of the drive current. On the other hand, when the pulse current is output from pulse current output circuit 21B with the polarity of output terminal T1B set negative and the polarity of output terminal T2B set positive, the pulse current is applied to B-phase winding 38*b* in a direction opposite to the direction of the drive current.

C-phase pulse current output circuit 21C has an output terminal T1C connected to connection node N5 and an output terminal T2C connected to connection node N6. Switch SW3 is connected between connection node N5 and a cathode of diode D6 or between connection node N6 and an anode of diode D5.

Pulse current output circuit 21C outputs the pulse current to C-phase winding 38*c* with switch SW3 and semiconductor switching elements S5, S6 controlled into the OFF state. When the pulse current is output from pulse current output circuit 21C with the polarity of output terminal T1C set positive and the polarity of output terminal T2C set negative, the pulse current is applied to C-phase winding 38*c* in the same direction as the direction of the drive current. On the other hand, when the pulse current is output from pulse current output circuit 21C with the polarity of output terminal T1C set negative and the polarity of output terminal T2C set positive, the pulse current is applied to C-phase winding 38*c* in a direction opposite to the direction of the drive current.

Control circuit 50 outputs a control signal to control semiconductor switching elements S1 to S6, switches SW2, SW3, and pulse current output circuits 21B, 21C. The other structure illustrated in FIG. 8 is the same as illustrated in FIG. 1, and therefore, like or corresponding parts are denoted by like reference numerals and a description thereof will not be repeated. Magnetic flux MF illustrated in motor main body 30 will be described later with reference to FIG. 10.

[Opening/Closing Timing of Each Semiconductor Switching Element and Output Timing of Pulse Current]

Figure 9:
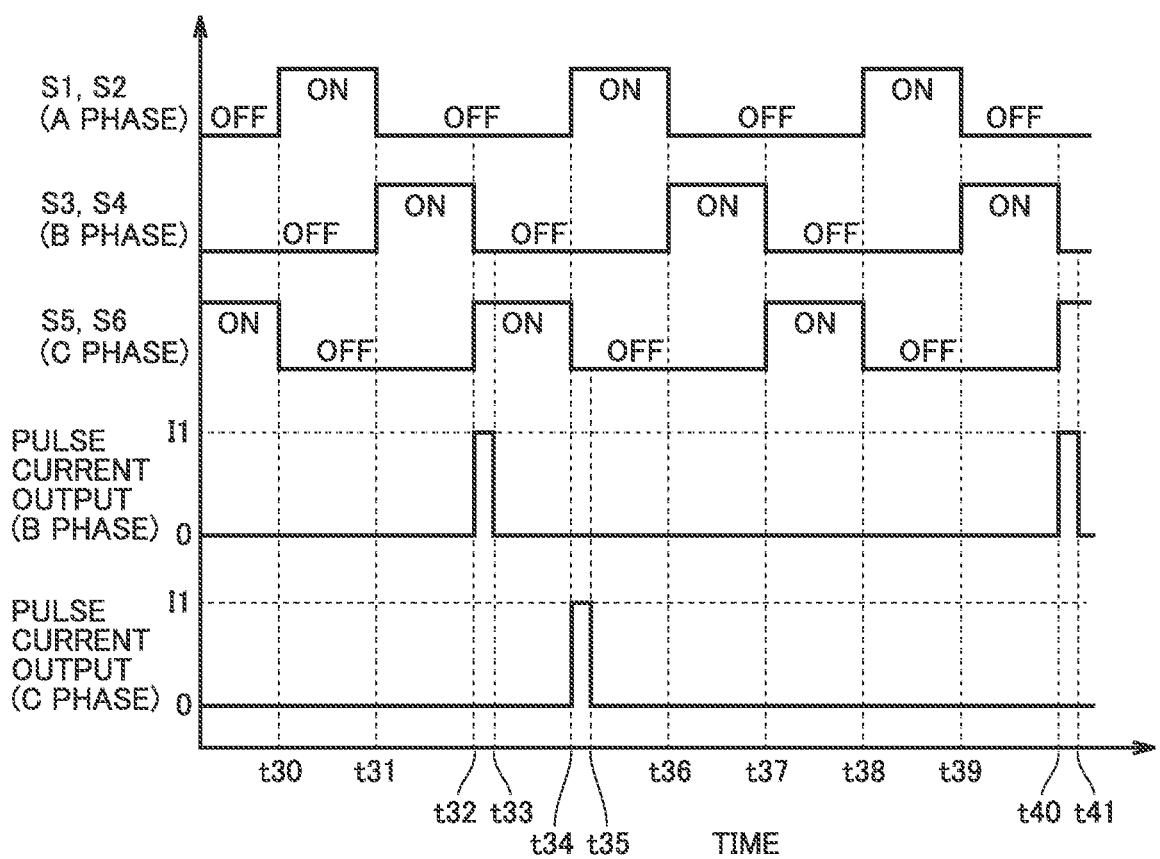
FIG. 9 is a timing chart of an opening/closing timing of each semiconductor switching element and an output timing of a pulse current output circuit in the switched reluctance motor illustrated in FIG. 8.

FIG. 9 is a timing chart of an opening/closing timing of each semiconductor switching element and an output timing of a pulse current output circuit in the switched reluctance motor illustrated in FIG. 8.

The timing chart illustrated in FIG. 9 shows that the application timing of the drive current is the same as the application timing of the timing chart illustrated in FIG. 4. That is, controlling semiconductor switching elements S1, S2 into the ON state between time t30 and time t31 causes the drive current to be applied to A-phase winding 38a. Controlling semiconductor switching elements S3, S4 into the ON state between next time t31 and time t32 causes the drive current to be applied to B-phase winding 38b. Controlling semiconductor switching elements S5, S6 into the ON state between next time t32 and time t34 causes the drive current to be applied to C-phase winding 38c. Similarly, the phase of drive winding 38 to which the drive current is applied between time t34 and time t40 is sequentially switched in the order of the A phase, the B phase, and the C phase.

Pulse current output circuit 21B applies the pulse current to B-phase winding 38b between time t32 and time t33 and between time t40 and time t41 when B-phase winding 38b and any one of rotor salient poles 36 of rotor 35 are nearly aligned. When the pulse current is applied to B-phase winding 38b, switch SW2 and semiconductor switching elements S3, S4 are all controlled into the OFF state. In FIG. 9, the pulse current is applied to B-phase winding 38b in the same direction as the direction of the drive current.

Pulse current output circuit 21C applies the pulse current to C-phase winding 38c between time t34 to time t35 when C-phase winding 38c and any one of rotor salient poles 36 of rotor 35 are nearly aligned. When the pulse current is applied to C-phase winding 38c, switch SW3 and semiconductor switching elements S5, S6 are all controlled into the OFF state. In FIG. 9, the pulse current is output to C-phase winding 38c in the same direction as the direction of the drive current.

As illustrated in FIG. 9, in order to improve homogeneity of magnetization of permanent magnets 40, 41, it is desirable that the pulse current being consecutively applied to B-phase winding 38b and C-phase winding 38c with the same current value. Both the applications of the pulse current cause permanent magnets 40, 41 to generate magnetic flux MF in the same direction. When the drive current is applied to the A-phase, the C-phase, and the B-phase in this order, the pulse current is consecutively applied to C-phase winding 38c and B-phase winding 38b.

[Magnetization of Permanent Magnet]

Figure 10:
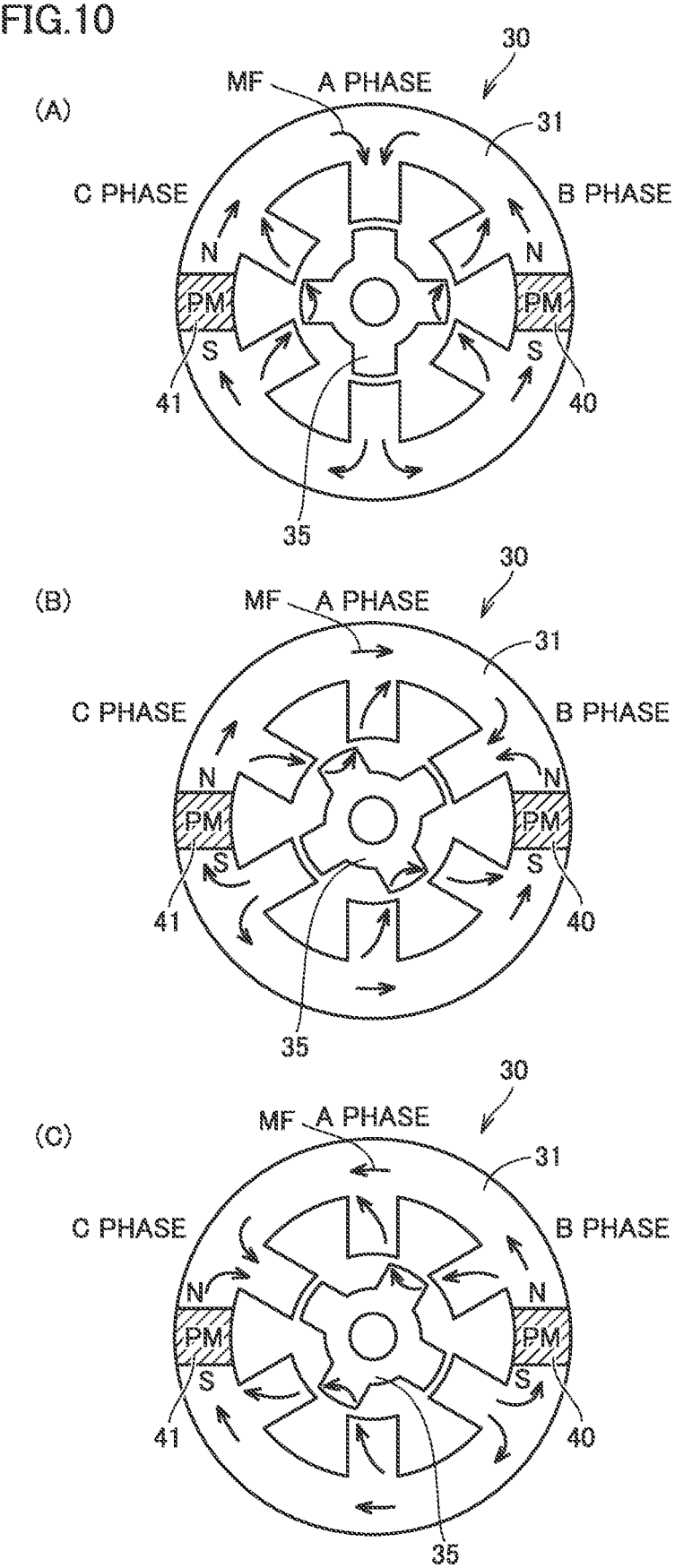
FIG. 10 is a diagram for describing how the permanent magnet provided in a stator is magnetized.

FIG. 10 is a diagram for describing how the permanent magnet provided in the stator are magnetized. FIG. 10(A) illustrates a magnetic flux distribution according to the first embodiment as a reference diagram, FIG. 10(B) illustrates a magnetic flux distribution between time t32 and time t33 in FIG. 9, and FIG. 10(C) illustrates a magnetic flux distribution between time t34 to time t35 in FIG. 9.

As illustrated in FIG. 10(A), according to the first embodiment, the pulse current is applied to A-phase winding 38a when A-phase winding 38a and any one of rotor salient poles of rotor 35 are nearly aligned. This may generate a diversion route of magnetic flux MF passing through the B-phase stator salient pole, the rotor salient pole, and the C-phase stator salient pole in parallel with the path of magnetic flux MF passing through permanent magnets 40, 41. When the rotor salient poles are designed to be wide, a ratio of magnetic flux MF passing through the diversion route increases, thereby causing a decrease in efficiency of magnetization of permanent magnets 40, 41.

As illustrated in FIG. 10(B), when B-phase winding 38b and any one of rotor salient poles of rotor 35 are nearly aligned, the pulse current is applied to B-phase winding 38b. In this case, the path of magnetic flux MF passing through permanent magnets 40, 41 and the diversion route of magnetic flux MF passing through the rotor salient pole are not parallel. Similarly, as illustrated in FIG. 10(C), when C-phase winding 38c and any one of the rotor salient poles of rotor 35 are nearly aligned, the pulse current is applied to C-phase winding 38c. In this case, the path of magnetic flux MF passing through permanent magnets 40, 41 and the diversion route of magnetic flux MF passing through the rotor salient pole are not parallel.

Therefore, with permanent magnets 40, 41 each provided between the B-phase stator salient pole and the C-phase stator salient pole, even when the pulse current is applied to either B-phase winding 38b or C-phase winding 38c, a decrease in efficiency of magnetization due to the diversion of magnetic flux MF does not occur. The pulse current may be applied to only either B-phase winding 38b or C-phase winding 38c, but in order to improve homogeneity of magnetization, it is desirable that the pulse current be applied to either B-phase winding 38b or C-phase winding 38c and then the pulse current be applied to other drive winding 38 with the same current value and polarity so as to cause permanent magnets 40, 41 to generate magnetic flux MF in the same direction.

[Effects of Second Embodiment]

As described above, the switched reluctance motor according to the second embodiment has not only the effect of the first embodiment, but also the effect of preventing a decrease in efficiency of magnetization of the permanent magnets due to the diversion route of the magnetic flux.

<Another Embodiment>

Hereinafter, another example of how the switched reluctance motor is controlled will be described with reference to FIG. 11. FIG. 11 is a diagram illustrating changes with time in load torque, motor torque, and current applied to each phase according to another embodiment.

As illustrated in FIG. 11(A), the load torque is constant at 10 [Nm]. The current applied to each phase illustrated in FIG. 11(C) is controlled by a torque control method so as to make the load torque equal to the motor torque illustrated in FIG. 11(B). As illustrated in FIG. 11(B), no large torque ripple occurs in the motor output.

<Modification of Each Embodiment>

Instead of the 6/4 motor main body, a motor main body including 12 stator poles and 8 rotor poles, a so-called 12/8 motor main body, may be used. Also in this case, each permanent magnet is provided in stator yoke 33 at an intermediate position between B-phase stator salient pole 32 and C-phase stator salient pole 32 adjacent to each other. In this case, a total of four permanent magnets are provided. The output timing of the pulse current from pulse current output circuit 21 is the same as in the 6/4 motor body described in the first and second embodiments. More generally, when the number of stator salient poles and the number of rotor salient poles are increased, the permanent magnets may be arranged at any desired positions as long as the permanent magnets are arranged facing each other in a diameter direction of the annular stator yoke in which a magnetic flux flow in one direction can be used, and the total number of the permanent magnets is an even number.

It should be understood that the embodiments disclosed herein are illustrative in all respects and not restrictive. The scope of the present invention is defined by the terms of the claims rather than the above description, and is intended to include any modifications within the meaning and scope equivalent to the terms of the claims.

REFERENCE SIGNS LIST

10: switched reluctance motor, 20: drive circuit, 21: pulse current output circuit, 22: DC power supply, 30: motor main body, 31: stator, 32: stator salient pole, 33: stator yoke, 35: rotor, 36: rotor salient pole, 38: drive winding, 38a: A-phase winding, 38b: B-phase winding, 38c: C-phase winding, 40, 41: permanent magnet, 50: control circuit, D1 to D6: diode, Hc: external magnetic field, N1 to N6: connection node, NN: negative node, NP: positive node, S1 to S6: semiconductor switching element, SW1: switch.

The invention claimed is:

1. A switched reluctance motor comprising:
  a motor main body including:
    a rotor having a plurality of rotor salient poles;
    a stator having a plurality of stator salient poles;
    a drive winding of each phase wound around stator salient poles of the plurality of stator salient poles, of the phase; and
    a permanent magnet disposed in a stator yoke and changeable in magnetization state by means of a magnetic field caused by current flow;
  a drive circuit that outputs a drive current to the drive winding of each phase to rotate the rotor; and
  a pulse current output circuit that outputs a pulse current to be superimposed on the drive current during an application time shorter than an application time of the drive current to the drive winding of each phase, thereby causing the drive winding of each phase to generate a magnetic flux in a magnetic circuit extending through the rotor, the stator, and the permanent magnet and thereby causing a change in the magnetization state of the permanent magnet.

2. The switched reluctance motor according to claim 1, wherein
  the permanent magnet is provided at an intermediate position between respective stator salient poles of a first phase and a second phase adjacent to each other,
  the switched reluctance motor further comprises a control circuit that outputs a command to the pulse current output circuit when a stator salient pole of a third phase and any one of the plurality of rotor salient poles are aligned, and
  the pulse current output circuit outputs the pulse current to a drive winding of the third phase in accordance with the command.

3. The switched reluctance motor according to claim 1, wherein
  the permanent magnet is provided at an intermediate position between respective stator salient poles of a first phase and a second phase adjacent to each other,
  the switched reluctance motor further comprising a control circuitry that outputs a first command to the pulse current output circuit when a stator salient pole of the first phase and any one of the plurality of rotor salient poles are aligned, and
  the pulse current output circuit outputs the pulse current to a drive winding of the first phase in accordance with the first command.

4. The switched reluctance motor according to claim 3, wherein
  the drive circuit sequentially outputs the drive current to the drive winding of the first phase, a drive winding of the second phase, and a drive winding of a third phase,
  the control circuit outputs, after outputting the first command, a second command to the pulse current output circuit when a starter salient pole of the second phase and any one of the plurality of rotor salient poles are aligned, and
  the pulse current output circuit outputs the pulse current to the drive winding of the second phase in accordance with the second command.

5. The switched reluctance motor according to claim 1, wherein
  the application time during which the pulse current output circuit outputs the pulse current has a value that is greater than 10 times an electrical time constant and less than one-tenth of a mechanical time constant,
  the electrical time constant is defined as a quotient of an average inductance of each phase of the motor main body by a resistance value of the drive winding of each phase, and
  the mechanical time constant is defined as a quotient of a moment of inertia of the rotor by a damping coefficient of the rotor.

6. The switched reluctance motor according to claim 1, wherein the permanent magnet is an alnico magnet or an iron-chromium-cobalt magnet.

* * * * *